(12) United States Patent
Frossard et al.

(10) Patent No.: US 7,228,535 B2
(45) Date of Patent: Jun. 5, 2007

(54) METHODS AND APPARATUS FOR MULTIMEDIA STREAM SCHEDULING IN RESOURCE-CONSTRAINED ENVIRONMENT

(75) Inventors: Pascal Frossard, Bulle (CH); Zhen Liu, Tarrytown, NY (US); Olivier Verscheure, Harrison, NY (US)

(73) Assignee: International Business Machines Corporation, Armonk, NY (US)

( * ) Notice: Subject to any disclaimer, the term of this patent is extended or adjusted under 35 U.S.C. 154(b) by 670 days.

(21) Appl. No.: 10/429,449

(22) Filed: May 5, 2003

(65) Prior Publication Data

US 2004/0225744 A1 Nov. 11, 2004

(51) Int. Cl.
*G06F 9/45* (2006.01)
(52) U.S. Cl. ...................... 717/158; 717/155
(58) Field of Classification Search ........ 717/104–114; 725/329–369
See application file for complete search history.

(56) References Cited

U.S. PATENT DOCUMENTS

| | | | | |
|---|---|---|---|---|
| 6,857,132 B1* | 2/2005 | Rakib et al. | ................ | 725/114 |
| 6,999,432 B2* | 2/2006 | Zhang et al. | ............... | 370/328 |
| 2004/0103189 A1* | 5/2004 | Cherkasova et al. | ........ | 709/224 |

OTHER PUBLICATIONS

1. J.-Y. Le Boudec et al., "Optimal Smoothing for Guaranteed Service," IEEE/ACM Transactions on Networking, vol. 8, No. 6, pp. 689-696, Dec. 2000.

2. J.-Y. Le Boudec, "Application of Network Calculus to Guaranteed Service Networks," IEEE Transactions on Information Theory, vol. 44, No. 3, pp. 1087-1096, May 1998.

3. Dimitri P. Bertsekas, "Constrained Optimization and Lagrange Multiplier Methods," Athena Scientific, Belmont, Massachusetts, Chapter 1 and Chapter 5, 1996.

* cited by examiner

*Primary Examiner*—Chuck Kendall
(74) *Attorney, Agent, or Firm*—Anne V. Dougherty; Ryan, Mason & Lewis, LLP

(57) ABSTRACT

Techniques for computing a multimedia stream schedule in a resource-constrained environment. In one aspect of the invention, a technique for processing multiple media streams in accordance with a resource-constrained environment includes the following steps/operations. An optimization associated with a composite representation of the multiple media streams is computed based on timing constraints associated with the multiple media streams and one or more constraints associated with at least one device in the resource-constrained environment useable to present at least one of the multiple media streams. Scheduling transmission and/or storage of the multiple media streams, based on the optimization, is then performed. The multiple media streams may be encoded, based on the optimization, prior to the scheduling step/operation. Advantageously, the present invention may provide a scheduling strategy to multiplex multiple objects in a resource-constrained data path, while respecting all the presentation deadlines, and minimizing the required playback delay and decoding buffer.

26 Claims, 5 Drawing Sheets

METHODS AND APPARATUS FOR MULTIMEDIA STREAM SCHEDULING IN RESOURCE-CONSTRAINED ENVIRONMENT

FIELD OF THE INVENTION

The present invention relates to processing of multimedia content and, more particularly, to techniques for computing a multimedia stream compression and transmission schedule in a resource-constrained environment.

BACKGROUND OF THE INVENTION

The development of techniques for effectively computing a scheduling strategy associated with the transmission of multimedia content (e.g., video, images, audio, etc.) has been given considerable attention. Issues of concern relating to such scheduling strategies that some existing techniques address include attempting to meet deadlines imposed by the content author with respect to the presentation of the multimedia content, and attempting to meet constraints on available bandwidth associated with the transmission channel.

There are existing scheduling approaches that are directed toward the transmission of video from a server to a client device. Some of these approaches attempt to minimize bandwidth associated with the transmission channel between the server and the client, while others attempt to optimize the distortion of an uncompressed video stream.

SUMMARY OF THE INVENTION

The present invention provides techniques for computing a multimedia stream schedule in a resource-constrained environment. In one aspect of the invention, a technique for processing multiple media streams in accordance with a resource-constrained environment includes the following steps/operations. An optimization associated with a composite representation of the multiple media streams is computed based on timing constraints associated with the multiple media streams and one or more constraints associated with at least one device in the resource-constrained environment useable to present at least one of the multiple media streams. Scheduling transmission and/or storage of the multiple media streams, based on the optimization, is then performed. The multiple media streams may be encoded, based on the optimization, prior to the scheduling step/operation.

Advantageously, the present invention may provide a scheduling strategy to multiplex multiple objects in a resource-constrained data path, while respecting all the presentation deadlines, and minimizing the required playback delay and decoding buffer associated with a device used to present the multimedia content to an end user. When these factors are imposed, the present invention may achieve a rate-distortion optimal multimedia presentation, given the environment constraints. The optimality may be reached with a low complexity methodology, taking into account the relative weighting of the different multimedia objects (e.g., streams), to accommodate any cost function. Also, the invention overcomes disadvantages associated with existing multimedia scheduling techniques which assume that client devices have no storage space limitations.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The following description will illustrate the invention using an exemplary multimedia transmission environment. It should be understood, however, that the invention is not limited to use with any particular environment. The invention is instead more generally applicable for use with any multiple data stream transmission and/or storage environment in which it is desirable to compute a schedule for transmission and/or storage of the multiple data streams, such that the schedule respects presentation deadlines and optimizes constraints associated with the resource environment including transmission and/or storage channel constraints and constraints associated with one or more resources that may be used to present one or more of the data streams. As used herein, a data stream is to be considered one example of a data object.

Thus, in this illustrative explanation of the principles of the invention, a framework is considered where multiple multimedia objects with respective deadlines have to be multiplexed into common constrained resources, where the constraints can be described in terms of available bandwidth and storage space (e.g., buffering). A particular scenario may be the transmission of a rich media presentation, composed of different multimedia streams (e.g., video, images, audio, text, etc.) on a constrained channel, where the scheduling strategy has to respect the presentation deadlines imposed by the author.

Figure 1:
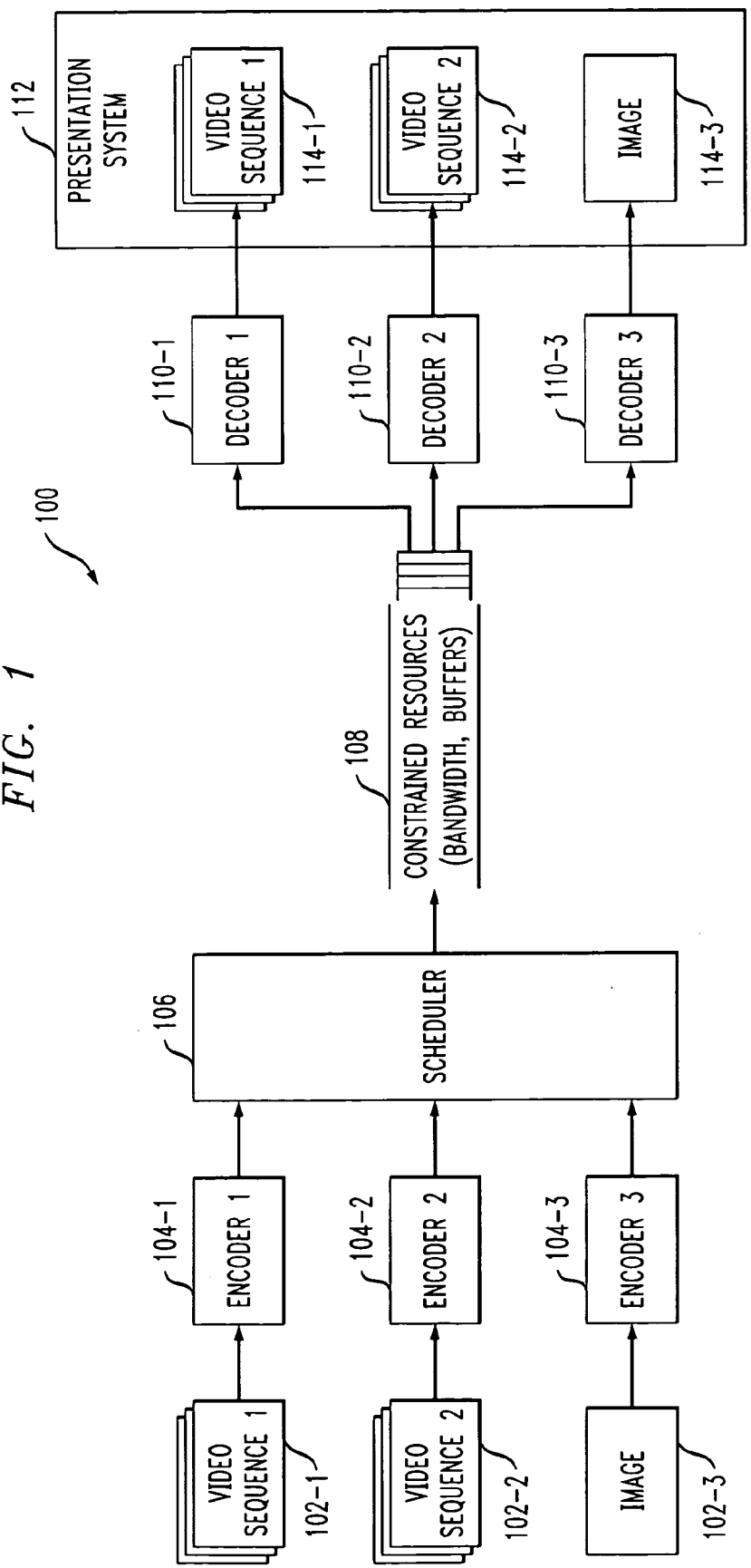
FIG. 1 is a block diagram illustrating a multimedia content-based environment in which the present invention may be implemented.

Referring initially to FIG. 1, a block diagram illustrates a multimedia content-based environment in which the present invention may be implemented. In this illustrative embodiment, environment 100 includes continuous and non-continuous media assets such as video sequences 1 and 2 (102-1 and 102-2) and image 102-3, encoders 104-1 through 104-3 which compress the media streams, a media scheduler 106 which schedules transmission/storage of the media streams, constrained resources 108 which may include bandwidth and storage limitations associated with the transmission channel and device storage buffers, media decoders 110-1 through 110-3 which decode the media streams, and a presentation system 112 which presents decoded versions of video sequences 1 and 2 and image (denoted as 114-1 through 114-3) to an end user. The presentation system depends on the media, e.g., a video display may be used to present video, images, text, while an audio speaker may be used to present audio.

It is to be appreciated that the encoders and scheduler may be part of one or more content servers, while the decoders and presentation system may be part of one or more client devices. Depending on the application, the constrained resources may be part of the client, or part of both the client and the server. It is to be further appreciated that while FIG. 1 illustrates processing of only three media streams, the invention may be implemented with more or less media streams.

However, the invention can also be applied to more generic scheduling problems, where several different objects, of different properties (e.g., size, deadlines), have to be sent through a constrained channel, or constrained data path, such as a satellite uplink, server input/output ports, digital subscriber line (DSL) connection, or digital versatile or video disc (DVD) player output.

As will be evident, the present invention allows for a simple, yet optimal encoding and smoothing of the composite media streams, while respecting the respective presentation deadlines, and meeting the constraints given in terms of available bandwidth and decoder buffer space. In the case where a feedback path exists between the scheduler and the encoders, the multimedia presentation is also optimized in a rate-distortion sense, given the traffic envelope, the limited buffering capabilities, and playback delay imposed by the environment.

Figure 2:
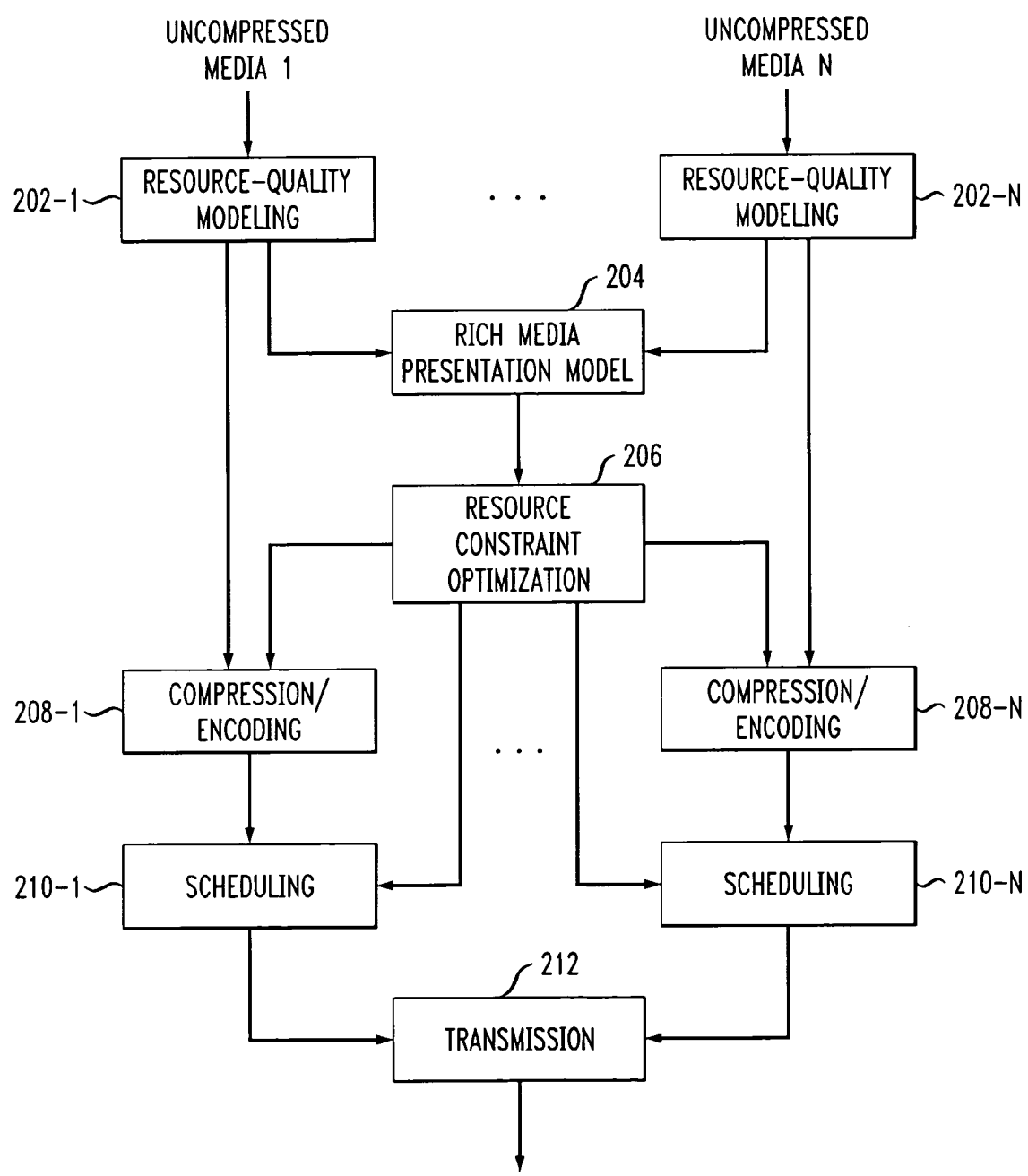
FIG. 2 is a flow/block diagram illustrating an adaptive multiple media stream scheduling methodology according to an embodiment of the present invention.

Referring now to FIG. 2, a flow/block diagram illustrates an adaptive multiple media stream scheduling methodology according to an embodiment of the present invention. As will be evident, the transmission scheduling decision adapts to the resource availability. The compression engine adapts to both the resource constraints and media characteristics. Such an approach can also be referred to as joint source coding and channel scheduling. It is to be appreciated that such methodology may be implemented, for example, by the encoders and scheduler shown in FIG. 1.

In accordance with principles of the invention, uncompressed media streams 1 through N are provided to resource-quality modeling blocks, respectively denoted as 201-1 through 202-N. Blocks 201-1 through 202-N model the rate-distortion of the respective media to be streamed. This modeling provides an estimation of the resource(s) needed to attain a given quality, or equivalently, the quality offered for constrained resources such as limited bandwidth. The output of each modeling block is a rate-distortion function associated with the media provided thereto. Such modeling will be described in further detail below.

In block 204, a rich media presentation model is composed along with the respective decoding deadlines to be respected at the decoder side. Modeling block 204 generates a timing diagram of the resource (bandwidth) consumption for the rich media or global presentation, given the individual timing constraints (e.g., presentation deadlines) associated with each media stream. A global presentation or rich media presentation refers to a composite representation of media streams 1 through N. This is accomplished by adding up the rate-distortion functions individually modeled in block 202-1 through 202-N, based on the timing constraints associated with each media stream.

In block 206, the rich media presentation model generated in block 204 is optimized, given the resource constraints of the environment. This is accomplished by performing a linear complexity optimization operation, which will be described in detail below. Block 206 takes into account the timing diagram generated in block 204, as well as constraints associated with the resources of the environment, including, for example, bandwidth and buffering limitations associated with the transmission channel and playback (client) device.

In blocks 208-1 through 208-N, the respective media streams are encoded (e.g., compressed) according to parameters computed in optimization block 206. The parameters include the rate-distortion functions and the upper and lower bounds, as will be explained in further detail below. Examples of encoding techniques that may be employed include the modulation of the quantization scale factor (affects spatial quality) or the modulation of the frame rate (affects temporal quality). However, it is to be understood that the invention is not limited to any particular encoding techniques and, in fact, may be employed without encoding techniques (e.g., uncompressed media streams).

In blocks 210-1 through 210-N, the encoded media streams are respectively scheduled according to a trajectory representing the cumulative rate function from the beginning to the end of the composite media presentation computed in optimization block 206. The scheduling operation will be explained in detail below.

In block 212, the media streams are transmitted (or stored), in accordance with the scheduling strategy imposed based on the optimization. The media streams may be multiplexed together for transmission (or storage).

Given the above illustrative framework, details and further examples of the modeling, optimization and scheduling operations are now described.

The scheduling methodology of the invention represents the cumulative rate requirements of the individual streams, as a function of a common time baseline. This is what is done in accordance with block 204. The individual streams or objects are added together to form a cumulative or composite representation of the streams, referred to as a rich media presentation.

Figure 3:
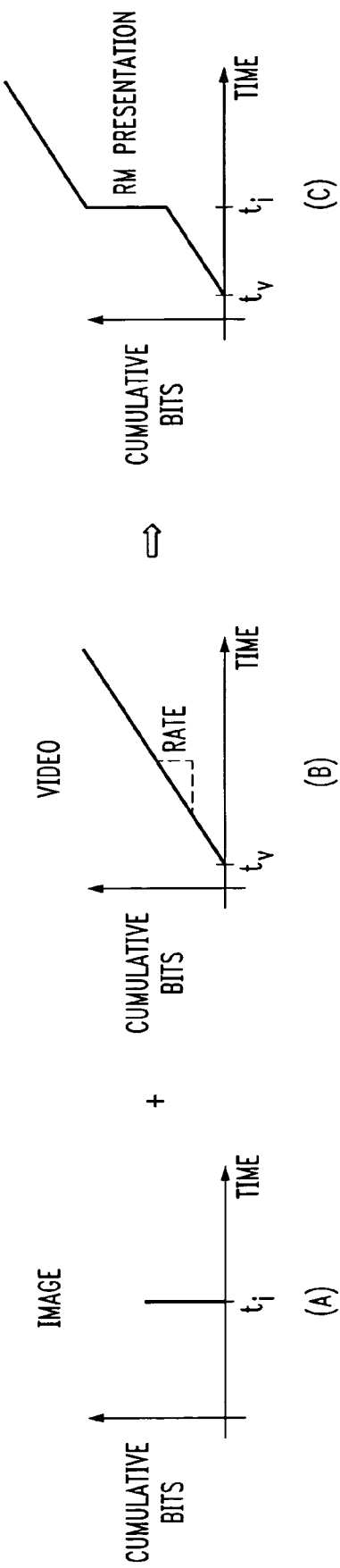
FIGS. 3A through 3C are diagrams graphically illustrating an example of rich media presentation modeling according to an embodiment of the present invention.

FIGS. 3A, 3B and 3C are diagrams graphically illustrating an example of rich media presentation modeling according to an embodiment of the present invention. More particularly, FIG. 3A shows an image object, while FIG. 3B shows a video object. FIG. 3C shows an example of a cumulative representation of the image object and the video object (prior to scheduling).

The cumulative representation or composite stream representation is then optimally smoothed in order to respect the bandwidth constraints imposed by the environment (i.e., the service curve), and the resulting smoothed version corresponds to the cumulative stream that is output from the scheduler (e.g., 106 in FIG. 1 or transmission block 212 in FIG. 2). A service curve is an abstract representation of the constraint(s) of an environment. For example, a guaranteed service network imposes a maximum constraint on the streaming rate (e.g., a maximum peak rate). The order in which the bytes of the different objects are output is determined by a horizontal projection (or trajectory) along the time axis, from the composite stream as required by the decoder, onto the smoothed composite curve. The point on the smoothed curve directly corresponds to the instant the different bytes or packets have to be output from the scheduler. In other words, the projection must be such that none of the media schedule is violated. That is, if frame I of media j has to be rendered at time $t^*$, then the content of this frame must be in the appropriate client device buffer at time $t \leq t^*$.

Figure 4:
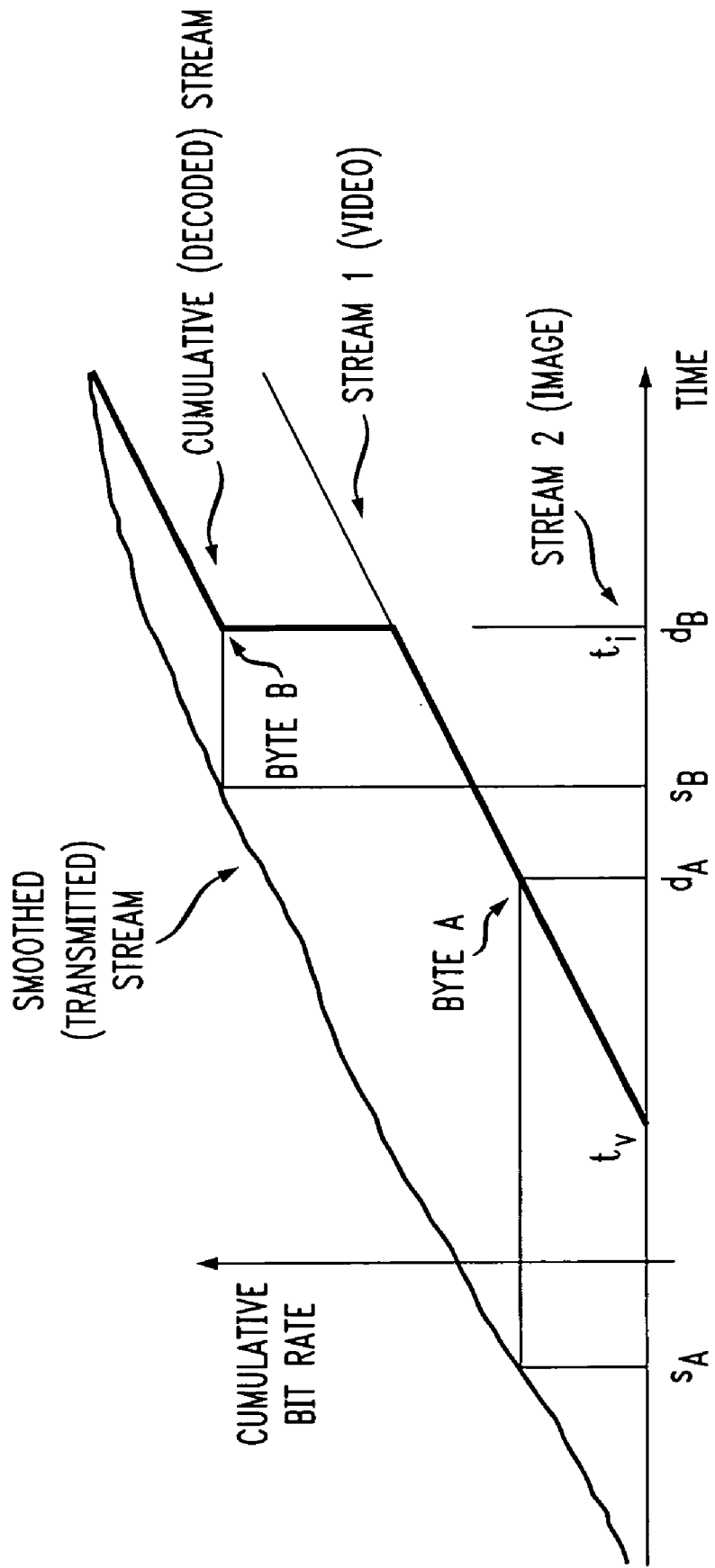
FIG. 4 is a diagram graphically illustrating a scheduling strategy, corresponding to the rich media presentation of FIG. 3C, according to an embodiment of the present invention.

FIG. 4 is a diagram graphically illustrating a scheduling strategy, corresponding to the rich media presentation of FIG. 3C, according to an embodiment of the present invention. More particularly, the figure illustrates what is meant by the projection. That is, FIG. 4 depicts the cumulative rate of the composite media presentation, which is a representation of the rate of information the decoder retrieves from its buffer. In other words, FIG. 4 depicts the solution to the joint source coding and channel scheduling problem. Byte A is decoded at time dA. Thus, byte A must have been transmitted (streamed out of the server) no later than sA to ensure a continuous playback at the decoder (i.e., avoid client buffer underflow). This comment holds for byte B with respect to dB and sB. This fact graphically justifies the horizontal projection scheduling strategy. In other words, the horizontal projection ensures a continuous playback at the decoder.

This scheduling methodology can be shown to respect all the presentation deadlines, and minimize the requirements in terms of playback delay and buffering, since the smoothing method is optimal. Various existing smoothing techniques can be used. One example of a smoothing technique that can be used is described in J. Y. Le Boudec et al., "Optimal Smoothing for Guaranteed Service," IEEE/ACM Transactions on Networking, vol. 8(6), pp. 689-696, December 2000, the disclosure of which is incorporated by reference herein. Another example of a scheduling technique that may be used is called "Optimal Shaping" and is described in J. Y. Le Boudec, "Application of Network Calculus To Guaranteed Service Networks," IEEE Transactions on Information Theory, vol. 44, no. 3, May 1998, the disclosure of which is incorporated by reference herein. It is to be appreciated that the smoothing operations may be performed in accordance with scheduling blocks 210-1 through 210-N and transmission block 212, based on optimization block 206.

In the cases where playback delay and buffer space are imposed by the environment, and these constraints are smaller than the required resources given by the optimal smoothing strategy, the scheduler can jointly act on the encoding of the different streams, in order to decrease the requirements of the most greedy objects, when possible, or eliminate the less important objects in order to meet the constraints. From the knowledge of the smoothing strategy, and the available resources, the space of valid solutions for the composite stream can be determined.

Figure 5:
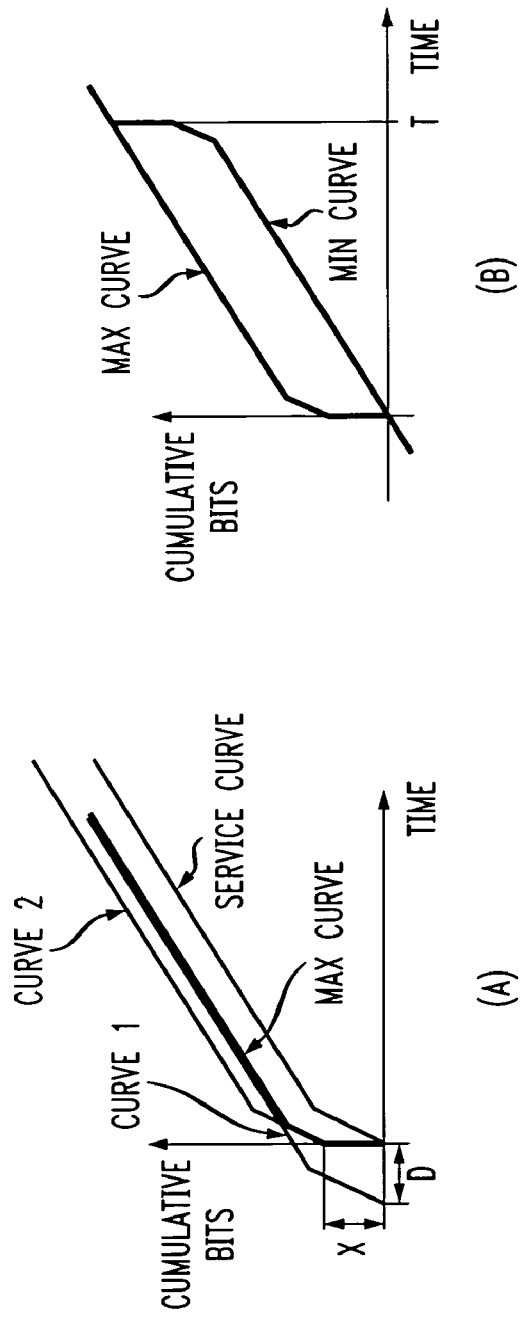
FIGS. 5A and 5B are diagrams graphically illustrating the space of valid solutions of the smoothed rich media presentation, corresponding to the scheduling strategy of FIG. 4, according to an embodiment of the present invention.

FIGS. 5A and 5B are diagrams graphically illustrating the space of valid solutions of the smoothed rich media presentation, corresponding to the scheduling strategy of FIG. 4, according to an embodiment of the present invention. X is the constraint on the buffer size in the client device. D is the constraint on the playback delay the client device must wait before starting to render the received media once the client device requested the streaming of that particular media stream. T is the duration of the media data. The service curve is the abstract representation of the constraints of the environment. The upper-bound constraint is computed as follows. The service curve is shifted to the left by the amount of D time units (Curve 1). The service curve is shifted above by the amount of X data units (Curve 2). The upper-bound is given by the minimum between Curve 1 and Curve 2. The lower-bound constraint is obtained via the same strategy in the time reversed domain. That is, the transformation r(t)=d(T)−d(T−t) is applied, where r(t) is the representation of d(t) in the reversed time domain. FIG. 5B shows both the upper-bound (Max curve) and the lower-bound (Min curve).

All solutions within this space will respect the constraints when smoothed by the above strategy. Among all the valid solutions, one solution is the optimal one, depending on the rate-distortion characteristics of the different streams or objects, $f_i(r_i)$, and the relative weights w(i) of the different objects, where the index i represents the time index. Efficient and simple models, and often piecewise linear approximations, may be used for the rate-distortion functions of video, audio and image streams. The relative weights simply correspond to the importance given to a particular media in the multimedia presentation. For example, if one prefers a high video quality, even at the price of a bad audio track, a higher weight factor may be set for the video stream as compared to that for the audio stream.

More formally, modeling, optimization and scheduling of the invention may be represented according to the following notation.

The rich media presentation is composed of a set of M media stream indexed by m. Each media stream is given a weight $w_i^m$ at time interval $I_i$. The time axis is divided in N interval $sI_i$ of duration $\Delta$. $r_i^m$ is the instantaneous rate of media m in time interval $I_i$. The cumulative rate is given by $$R_i^m = \sum_{j=0}^{i} r_j^m.$$

The minimal and maximal solutions of the smoothing, as represented in FIG. 5B, are respectively noted as $R_i^{min}$ (Min curve in FIG. 5B) and $R_i^{max}$ (Max curve in FIG. 5B). $d_i^m$ represents the distortion of media m in interval $I_i$. $f_i^m(r_i^m)$ is the rate-distortion function of media m in $I_i$, which is equivalent to $d_i^m = f_i^m(r_i^m)$.

The composite media stream optimal encoding is given by the following problem:

$$\text{Find } \{r_i^m\},$$

$$\text{that minimizes } \sum_{m=1}^{M} \sum_{i=1}^{N} w_i^m f_i^m(r_i^m)$$

$$\text{under } R_i^{min} \leq \sum_{m=1}^{M} \sum_{j=1}^{i} r_j^m \leq R_i^{max}.$$

This problem is solvable very efficiently by well-known fast linear programming methods. One example of such a fast linear programming method that may be used is described in Dimitri P. Bertsekas, "Constrained Optimization and Lagrange Multiplier Methods," Athena Scientific, Belmont, Mass., 1996, the disclosure of which is incorporated by reference. Once the composite stream representation that minimizes the cost function dependent on $f_i(r_i)$ and w(i) has been determined, the composite stream representation is scheduled exactly as described above.

Figure 6:
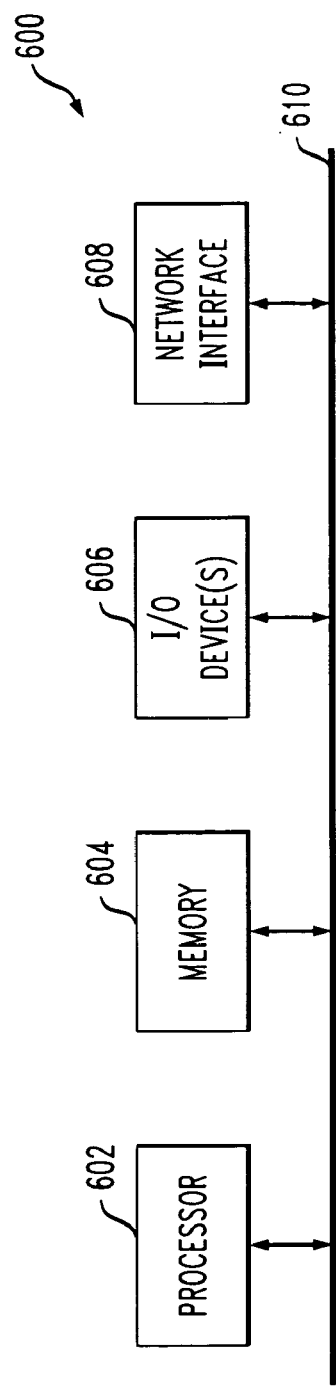
FIG. 6 is a block diagram illustrating an exemplary computing system environment for implementing a scheduling system according to an embodiment of the present invention.

Referring now to FIG. 6, a block diagram illustrates an exemplary computing system environment for implementing a scheduling system according to an embodiment of the present invention. More particularly, the functional blocks illustrated in FIGS. 1 and 2 may implement such a computing system 600 to perform the techniques of the invention. For example, a server implementing the scheduling principles of the invention may implement such a computing system. A client device may also implement such a computing system. Of course, it is to be understood that the invention is not limited to any particular computing system implementation.

In this illustrative implementation, a processor 602 for implementing at least a portion of the methodologies of the invention is operatively coupled to a memory 604, input/output (I/O) device(s) 606 and a network interface 608 via a bus 610, or an alternative connection arrangement. It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc.

In addition, the phrase "I/O devices" as used herein is intended to include one or more input devices (e.g., keyboard, mouse, etc.) for inputting data to the processing unit, as well as one or more output devices (e.g., CRT display, etc.) for providing results associated with the processing unit.

Still further, the phrase "network interface" as used herein is intended to include, for example, one or more devices capable of allowing the computing system 600 to communicate with other computing systems. Thus, the network interface may include a transceiver configured to communicate with a transceiver of another computing system via a suitable communications protocol, over a suitable network, e.g., the Internet, private network, etc. It is to be understood that the invention is not limited to any particular communications protocol or network.

It is to be appreciated that while the present invention has been described herein in the context of a scheduling system, the methodologies of the present invention may be capable of being distributed in the form of computer readable media, and that the present invention may be implemented, and its advantages realized, regardless of the particular type of signal-bearing media actually used for distribution. The term "computer readable media" as used herein is intended to include recordable-type media, such as, for example, a floppy disk, a hard disk drive, RAM, compact disk (CD) ROM, etc., and transmission-type media, such as digital and analog communication links, wired or wireless communication links using transmission forms, such as, for example, radio frequency and optical transmissions, etc. The computer readable media may take the form of coded formats that are decoded for use in a particular data processing system.

Accordingly, one or more computer programs, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 602.

In any case, it is to be appreciated that the techniques of the invention, described herein and shown in the appended figures, may be implemented in various forms of hardware, software, or combinations thereof, e.g., one or more operatively programmed general purpose digital computers with associated memory, application-specific integrated circuit(s), functional circuitry, etc. Given the techniques of the invention provided herein, one of ordinary skill in the art will be able to contemplate other implementations of the techniques of the invention.

Advantageously, as is evident from the above detailed description, the present invention applies to any object type (e.g., video, image, audio, text, etc.), any client device (e.g., high-end personal computers, mobile phones, etc.) and any limited resource through which the composite object stream must flow (e.g., constant bit rate satellite channel, variable bit rate guaranteed service channel, disk server, DVD) as long as a streaming channel can be deterministically defined.

Furthermore, in accordance with the present invention, it is to be appreciated that source coding (jointly performed with channel scheduling) could simply include a description selection (or source rate selection). For example, a video signal is encoded (compressed) at various bit rates. The resulting streams are stored on disk. The optimization-based methodology of the present invention is then applied on these encoded streams. The source coding includes selecting (e.g., on a frame basis) the most appropriate description (version of a compressed frame, e.g., if there are two streams at 56 and 128 kilobits per seconds, respectively, select either the 56 kbps version or the 128 kbps version) such that the overall distortion is minimized under the constraints. Thus, this applies to various encoding techniques of stored media including scaleable (or layered) coding.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of processing multiple media streams in accordance with a resource-constrained environment, the method comprising the steps of:
    computing an optimization associated with a composite representation of the multiple media streams based on timing constraints associated with the multiple media streams and one or more constraints associated with at least one device in the resource-constrained environment useable to present at least one of the multiple media streams; and
    scheduling at least one of transmission and storage of the multiple media streams based on the optimization;
    wherein computing the optimization further comprises assigning a relative weight to at least one of the multiple media streams such that the relative weight corresponds to an importance of the media stream.

2. The method of claim 1, further comprising the step of encoding the multiple media streams based on the optimization, prior to the scheduling step.

3. The method of claim 1, further comprising the step of modeling the timing constraints associated with the multiple media streams for use by the optimization computation step.

4. The method of claim 1, further comprising the step of modeling the constraints associated with the resource-constrained environment for use by the optimization computation step.

5. The method of claim 1, wherein at least one of the multiple media streams comprises one of video data, image data, text data and audio data.

6. The method of claim 1, wherein the resource-constrained environment comprises a bandwidth-limited channel.

7. The method of claim 6, wherein the bandwidth-limited channel comprises one of a digital subscriber line connection and a satellite link.

8. The method of claim 1, wherein the resource-constrained environment comprises a disc bandwidth-constrained server.

9. The method of claim 8, wherein the disc bandwidth-constrained server comprises a digital versatile or video disc player.

10. The method of claim 1, further comprising the step of encoding the multiple media streams, prior to the optimization computation step.

11. Apparatus for processing multiple media streams in accordance with a resource-constrained environment, the apparatus comprising:
  a memory; and
  at least one processor coupled to the memory and operative to: (i) compute an optimization associated with a composite representation of the multiple media streams based on timing constraints associated with the multiple media streams and one or more constraints associated with at least one device in the resource-constrained environment useable to present at least one of the multiple media streams; and (ii) schedule at least one of transmission and storage of the multiple media streams based on the optimization;
  wherein computing the optimization further comprises assigning a relative weight to at least one of the multiple media streams such that the relative weight corresponds to an importance of the media stream.

12. The apparatus of claim 11, wherein the at least one processor is further operative to encode the multiple media streams based on the optimization, prior to the scheduling operation.

13. The apparatus of claim 11, wherein the at least one processor is further operative to model the timing constraints associated with the multiple media streams for use by the optimization computation operation.

14. The apparatus of claim 11, wherein the at least one processor is further operative to model the constraints associated with the resource-constrained environment for use by the optimization computation operation.

15. The apparatus of claim 11, wherein at least one of the multiple media streams comprises one of video data, image data, text data and audio data.

16. The apparatus of claim 11, wherein the resource-constrained environment comprises a bandwidth-limited channel.

17. The apparatus of claim 16, wherein the bandwidth-limited channel comprises one of a digital subscriber line connection and a satellite link.

18. The apparatus of claim 11, wherein the resource-constrained environment comprises a disc bandwidth-constrained server.

19. The apparatus of claim 18, wherein the disc bandwidth-constrained server comprises a digital versatile or video disc player.

20. The apparatus of claim 11, wherein the at least one processor is further operative to encode the multiple media streams, prior to the optimization computation operation.

21. Apparatus for processing multiple media streams in accordance with a resource-constrained environment, the apparatus comprising:
  at least one media server operative to: (i) compute an optimization associated with a composite representation of the multiple media streams based on timing constraints associated with the multiple media streams and one or more constraints associated with at least one device in the resource-constrained environment useable to present at least one of the multiple media streams; and (ii) schedule at least one of transmission and storage of the multiple media streams based on the optimization;
  wherein computing the optimization further comprises assigning a relative weight to at least one of the multiple media streams such that the relative weight corresponds to an importance of the media stream.

22. The apparatus of claim 21, wherein the at least one content server is further operative to encode the multiple media streams based on the optimization, prior to the scheduling operation.

23. The apparatus of claim 21, wherein the at least one content server is further operative to model the timing constraints associated with the multiple media streams for use by the optimization computation operation.

24. The apparatus of claim 21, wherein the at least one content server is further operative to model the constraints associated with the resource-constrained environment for use by the optimization computation operation.

25. The apparatus of claim 21, wherein the at least one content server is further operative to encode the multiple media streams, prior to the optimization computation operation.

26. An article of manufacture for processing multiple media streams in accordance with a resource-constrained environment, comprising a machine readable medium containing one or more programs which when executed implement the steps of:
  computing an optimization associated with a composite representation of the multiple media streams based on timing constraints associated with the multiple media streams and one or more constraints associated with at least one device in the resource-constrained environment useable to present at least one of the multiple media streams; and
  scheduling at least one of transmission and storage of the multiple media streams based on the optimization;
  wherein computing the optimization further comprises assigning a relative weight to at least one of the multiple media streams such that the relative weight corresponds to an importance of the media stream.

* * * * *